(12) United States Patent
Feng et al.

(10) Patent No.: US 10,252,754 B2
(45) Date of Patent: Apr. 9, 2019

(54) METHOD FOR REINFORCING A SUBFRAME

(71) Applicant: Henkel AG & Co. KGaA, Duesseldorf (DE)

(72) Inventors: Qing Feng, Shanghai (CN); Jingfen Zhang, Shanghai (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 327 days.

(21) Appl. No.: 15/098,448

(22) Filed: Apr. 14, 2016

(65) Prior Publication Data

US 2016/0229463 A1 Aug. 11, 2016

Related U.S. Application Data

(63) Continuation of application No. PCT/CN2013/085287, filed on Oct. 16, 2013.

(51) Int. Cl.
*B62D 29/00* (2006.01)
*B62D 21/11* (2006.01)
(Continued)

(52) U.S. Cl.
CPC .......... *B62D 29/002* (2013.01); *B29C 44/128* (2013.01); *B29C 44/18* (2013.01);
(Continued)

(58) Field of Classification Search
CPC .... B62D 29/002; B62D 29/005; B62D 21/02; B62D 21/11; B29C 44/128; B29C 44/18;
(Continued)

(56) References Cited

U.S. PATENT DOCUMENTS 3,415,568 A * 12/1968 Gugelot-Chuard ......................... B62D 29/046
296/181.2
6,793,274 B2 * 9/2004 Riley ................... B62D 21/152
296/187.03

(Continued)

FOREIGN PATENT DOCUMENTS

CN 1608014 A 4/2005
CN 101367403 A 2/2009
(Continued)

OTHER PUBLICATIONS

Supplementary EP Search Report for EP 13895744 dated May 11, 2017.
(Continued)

*Primary Examiner* — Sarang Afzali
(74) *Attorney, Agent, or Firm* — Mary K. Cameron

(57) ABSTRACT

The present invention relates to a method for reinforcing a vehicle subframe comprising one or more hollow sheet metal parts, comprising: determining at least one area on a hollow sheet metal part of a subframe with respect to specified conditions; preparing a reinforcement part which is insertable into the hollow sheet metal part at the determined area, wherein the reinforcement part comprises: a carrier having at least one hollow chamber; and a pre-foam of a foam material, which is able to expand after being heated, the pre-foam being isolated from the at least one hollow chamber and distributed at least partly on the periphery of the carrier; and installing the reinforcement part within the hollow sheet metal part at the determined area and heating the pre-foam such that it expands. The present invention also relates to a vehicle subframe reinforced by said method.

6 Claims, 3 Drawing Sheets

(51) Int. Cl.
    *B29C 44/18*     (2006.01)
    *B29C 44/12*     (2006.01)
    *B62D 21/02*     (2006.01)
    *B29K 105/04*     (2006.01)
    *B29K 677/00*     (2006.01)
    *B29L 31/30*     (2006.01)

(52) U.S. Cl.
    CPC .............. *B62D 21/02* (2013.01); *B62D 21/11* (2013.01); *B62D 29/005* (2013.01); *B29K 2105/04* (2013.01); *B29K 2677/00* (2013.01); *B29L 2031/3002* (2013.01); *Y10T 29/49622* (2015.01)

(58) Field of Classification Search
    CPC ........ B29L 2031/3002; B29K 2677/00; B29K 2105/04; Y10T 29/49622; Y10T 29/49616
    See application file for complete search history.

(56) References Cited

U.S. PATENT DOCUMENTS

| | | |
|---|---|---|
| 2001/0040387 A1 | 11/2001 | Takagi et al. |
| 2003/0127844 A1 | 7/2003 | Gloceri et al. |
| 2005/0218697 A1 | 10/2005 | Barz et al. |
| 2007/0075569 A1* | 4/2007 | Barz .................. B62D 25/04 296/203.02 |
| 2010/0262406 A1* | 10/2010 | Goel .................. G06F 17/5018 703/2 |
| 2011/0274910 A1 | 11/2011 | Kraushaar |
| 2012/0153669 A1 | 6/2012 | Kumar et al. |
| 2012/0315414 A1 | 12/2012 | Wesch et al. |

FOREIGN PATENT DOCUMENTS

| | | |
|---|---|---|
| CN | 102317140 A | 1/2012 |
| DE | 102009049313 A1 | 5/2011 |
| EP | 2165919 A1 | 3/2010 |
| EP | 1265778 B1 | 10/2016 |
| JP | 2002274427 A | 9/2002 |
| JP | 2005255068 A | 9/2005 |
| JP | 2012136175 A | 7/2012 |
| WO | 03042024 A1 | 5/2003 |
| WO | 2010097120 A1 | 9/2010 |
| WO | 2012087910 A1 | 6/2012 |
| WO | 2012140154 A1 | 10/2012 |

OTHER PUBLICATIONS

International Search Report PCT/CN2013/085287 dated Jul. 4, 2014, 2 pages. All references cited in the International Search Report are listed herein.

* cited by examiner

Step 1: Creating a computing model of a subframe for a vehicle.

Step 2: Analyzing the computing model of the subframe and finding one or more areas in which failure possibly occurs.

Step 3: Designing a reinforcement part for the area found in step 2.

Step 4: Installing the reinforcement part based on results of step 3 into the subframe.

METHOD FOR REINFORCING A SUBFRAME

FIELD OF THE INVENTION

The present invention generally relates to a reinforced vehicle subframe and also to a method for reinforcing such vehicle subframe.

BACKGROUND

In modern automotive vehicles, subframes are widely used for isolating vibration and increasing connection strength of other relevant parts of the vehicles, such as engines, powertrains, suspension systems or the like. For example, a subframe is usually provided in an automotive vehicle. The subframe is attached to the vehicle body, and is mounted with a suspension system thereon. In this way, the suspension system is associated with the vehicle body such that less vibration can be transmitted from an engine of the vehicle or roads to the suspension system or a passenger compartment of the vehicle. Since the suspension system is connected indirectly with the vehicle body itself via the subframe, the suspension system can be more reliably secured relative to the vehicle body.

The subframe is usually made by sheet metal parts. In order to reduce the total weight of the vehicle, the subframe should be light. For example, aluminum alloy or titanium alloy or the like can be used to manufacture the subframe. Further, in order to enable the subframe to be lighter, the thickness of the sheet metal part of the subframe is designed to be as little as possible. However, if the sheet metal part of the subframe is too thin, the stiffness of the subframe itself will be insufficient to bear the suspension system and attach to the vehicle body. Therefore, it is desirable to find a way of reducing the weight of the subframe itself while enabling it to have sufficient stiffness.

Patent publication EP2165919 discloses a reinforced structure including a structural component (2) and a reinforcing part (4) that is arranged in a cavity of the structural component, wherein the reinforcing part (4) comprises a support part (5) and connection means (6) which can be a foamed material. However, this reference does not concern how to lighten and strengthen the subframe. Rather, this reference concerns how to optimize use of the activatable foamed material. Specifically, the optimization is achieved by using a lesser amount of the activatable foamed material at positions with high deformation than at positions with low deformation of the component.

Patent publication US20120315414 discloses a composite component made up of a shell at least locally and peripherally delimiting a space and also discloses a structural component with structural material being provided at least locally between the shell and the structural component. This reference does not concern how to lighten and strengthen the subframe either.

Patent publication WO2012140154 generally concerns how to reinforce attachment of a subframe to a mainframe of a vehicle. This reference does not concern how to lighten and strengthen the subframe itself.

As mentioned above, the subframe of the vehicle should be designed to have high stiffness and low weight such that the vehicle can run more fuel-efficiently and can be manufactured at lower costs. To this end, the subframe should be made by reducing use of sheet metal parts and by adding other alternative parts. However, it is difficult and unknown to determine how to reduce the use of sheet metal parts with maintaining the stiffness of the subframe.

SUMMARY OF THE INVENTION

It is an object of the present invention to propose a subframe for a vehicle and a method for reinforcing the subframe, such that the subframe is more lightweight and stiff, and can be manufactured at lower costs.

In one aspect of the present invention, a method for reinforcing a vehicle subframe comprising one or more hollow sheet metal parts is provided, wherein the method comprises:

a step of determining at least one area on the hollow sheet metal part of the subframe with respect to specified conditions;

a step of preparing a reinforcement part which is able to be inserted in the hollow sheet metal part of the subframe at said area, wherein the reinforcement part comprises a lightweight carrier for supporting the sheet metal part and a pre-foam of a foam material which is able to expand after being heated, wherein the lightweight carrier comprises at least one hollow chamber and wherein the pre-foam is isolated from the at least one hollow chamber and is distributed at least partly on the periphery of the carrier; and a step of installing the reinforcement part within the sheet metal part of the subframe at the determined area and supplying heat to the pre-foam such that it expands to secure the reinforcement part within the subframe.

Preferably, the step of determining the area is achieved by topology optimization technology in a computer.

Preferably, the area is defined as an area of the sheet metal part of the subframe in which the most stress or failure possibly occurs in the case that a static or dynamic load is applied to the subframe.

Preferably, the applied load is substantially the same as that applied to a subframe of an actually running vehicle.

Preferably, the sheet metal part of the subframe is thinned at the determined area.

Preferably, the lightweight carrier is made of Polyamide.

Preferably, the carrier is made by a plurality of thin-wall sections for forming said at least one hollow chamber.

Preferably, in the step of preparing the reinforcement part, the carrier is placed in a mold which is manufactured similarly to the determined area, and then the pre-foam is injected into the mold such that it is able to distribute at least partly on the periphery of the carrier.

Preferably, heat is supplied to the pre-foam after the reinforcement part is transported through a coating line designed for the subframe.

In another aspect of the present invention, a vehicle subframe is provided, the subframe comprising one or more hollow sheet metal parts, wherein the subframe is reinforced by a reinforcement part in at least one predetermined area thereof, the reinforcement part comprises a lightweight carrier for supporting an inner surface of the sheet metal part and a pre-foam of a foam material which is able to expand after being heated, the carrier comprises at least one hollow chamber enabling the carrier to be light, the pre-foam is isolated from said at least one hollow chamber and is located at least partly on the periphery of the carrier, after the reinforcement part is arranged within the sheet metal part at the area, heat is supplied to the pre-foam such that it expands to secure the reinforcement part within the subframe.

Preferably, the area is determined by topology optimization technology via a computer.

Preferably, the area is defined as an area of the sheet metal part of the subframe in which the most stress or failure possibly occurs in the case that a static or dynamic load is applied to the subframe.

Preferably, the applied load is substantially the same as that applied to a subframe of an actually running vehicle.

Preferably, the sheet metal part of the subframe is thinned at the determined area.

Preferably, the lightweight carrier is made of Polyamide.

Preferably, the carrier is made by a plurality of thin-wall sections for forming said at least one hollow chamber.

Other individual features or features which are combined with other features so as to be considered as belonging to the characteristics of the present invention will be described in the attached claims.

The configuration of the present invention as well as other objectives and beneficial effects thereof will be well understood by a description of preferred embodiments in accompany with the drawings.

BRIEF DESCRIPTION OF THE DRAWINGS

In order to provide further explanations of the present invention, the drawings, as a part of the description, illustrate preferred embodiments of the present invention, and they are used to explain principles of the present invention together with the description. In the drawings.

DETAILED DESCRIPTION OF THE INVENTION

Figure 1:
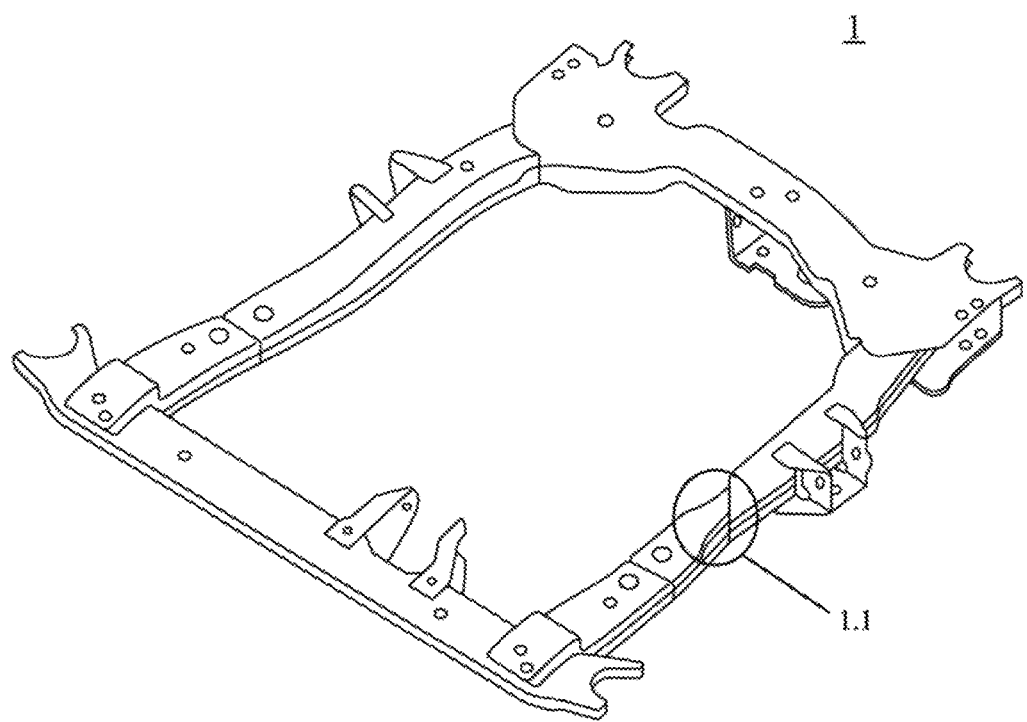
FIG. 1 schematically shows a perspective view of a computing model of a subframe adapted to an automotive vehicle.

In the attached drawings, the same components are indicated by the same reference numerals.

FIG. 1 schematically shows a subframe 1 adapted to an automotive vehicle. It should be noted that this subframe 1 is illustrated only as an example for the purpose of explaining the basic principle of the present invention. The subframe adapted to the automotive vehicle can be configured in various forms. The principle of the present invention is not limited by any illustrative embodiments which will be described below. That is, it is well-known for a person skilled in the art after reading the context of the present invention that the principle or method explained below is applicable for the subframe of any type.

The subframe 1 generally comprises a plurality of sheet metal parts. For example, each part can be made of lightweight metal, such as aluminum alloy, titanium alloy or the like. In order that the subframe 1 is as light as possible, the part is usually shaped to be hollow. In FIG. 1, four sheet metal parts are illustrated, which are assembled together to form the subframe 1 as a substantially rectangular shape. For instance, these sheet metal parts can be welded or riveted at their respective ends. It is appreciated that the shape of the subframe 1 can be adapted to various requirements of the vehicle.

In the prior art, researches mainly focus on how to reinforce attachment areas of the subframe 1 to other vehicle components. However, the present invention concerns how to reinforce the subframe 1 itself. To this end, topology optimization is introduced into design of the subframe.

In the mechanical design field, the topology optimization belongs to technology which is widely used to model, simulate and analyze a mechanical component by means of a computer. Many commercial softwares, such as ANSYS, HYPEWORK, and ABAQUS are available in the market to achieve the topology optimization. It should be understood that the present invention focuses not on algorithms of modeling, simulating and analyzing the subframe by the computer; but on application of the topology optimization. Therefore, the context of the present invention does not describe any concrete algorithm. It is assumed that knowledge relating to the concrete algorithm is well-known by the skilled person in the art who can use any one of said softwares skillfully.

When a static or dynamic load is applied to the subframe 1, different stresses may occur in difference areas of the subframe. However, according to our idea, it is unnecessary to reinforce the whole subframe so as to manufacture the subframe simply. The introduced topology optimization is used to find one or more areas of the subframe which need be reinforced effectively.

For instance, before the subframe 1 is manufactured in a workshop, it is created as a computing model in a computer, for example via ANSYS. Then, on the basis of the topology optimization technology, the computing model of the subframe 1 is analyzed in the computer. For instance, loads which are similar as those occurring in an actually running vehicle can be applied to the computing model. After computation, one or more areas of the subframe in which the largest stress and/or failure will most likely occur can be determined. As an example, in FIG. 1, an area 1.1 is regarded as such an area of the subframe 1 in which the largest stress and/or failure will most likely occur. That is, it is determined that the area 1.1 of the subframe 1 should be reinforced.

Figure 2:
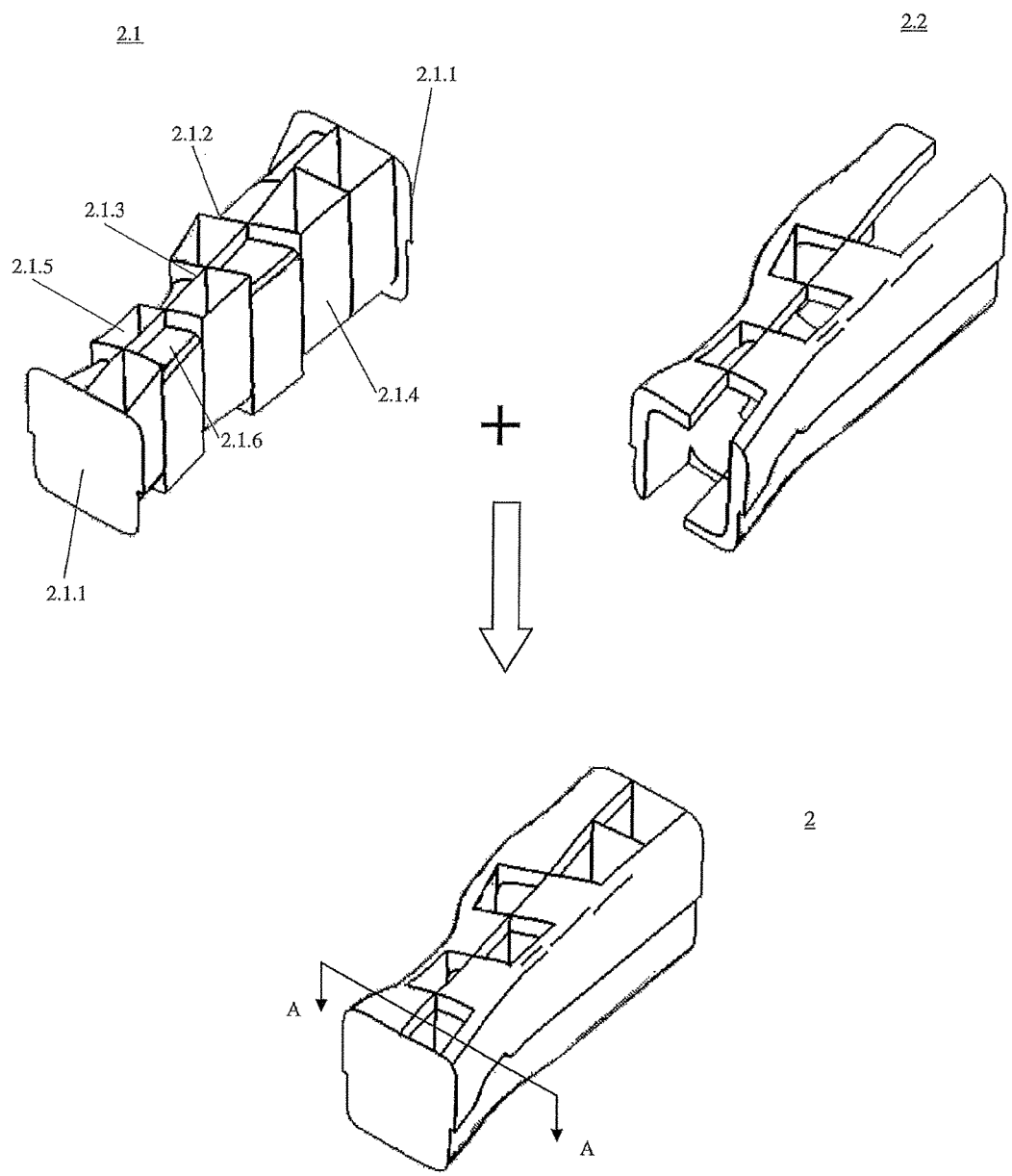
FIG. 2 schematically shows an exploded and perspective view of a reinforcement part according to an embodiment of the present invention.

FIG. 2 schematically shows an exploded and perspective view of the area 1.1 of the subframe 1 in which a reinforcement part 2 according to an embodiment of the present invention is used to reinforce this area. The reinforcement part 2 is received at the area 1.1 in a hollow interior of the sheet metal part of the subframe 1.

According to the present invention, the reinforcement part 2 is substantially comprised of a Polyamide (PA) carrier 2.1 and a pre-foam 2.2 of a foam material. The pre-foam 2.2 is secured in a solid state partly on a surface of the PA carrier 2.1. The reinforcement part 2 is inserted as a whole in the hollow interior of the subframe 1, especially in the hollow interior of the sheet metal of the subframe at the area 1.1 such that the pre-foam 2.2 may contact tightly with an inner surface of the area 1. Alternatively, it is appreciated that the carrier can be any lightweight carrier made of material lighter and stiffer than the sheet metal part.

The PA carrier 2.1 is for example formed as a shape illustrated in FIG. 2. In this figure, the PA carrier 2.1 is formed by two parallel end sections 2.1.1 and a plurality of thin-wall sections located between the two end sections 2.1.1. Alternatively, each end section 2.1.1 is sized such that their edges may contact firmly with the inner surface of the sheet metal part. Furthermore, the longitudinal distance between the two end sections 2.1.1 is substantially equal to the longitudinal length of the area 1.1.

In said thin-wall sections, some thin-wall sections 2.1.2 are parallel with the two end sections 2.1.1, two thin-wall sections 2.1.3 (only one of them is visible in FIG. 2) are perpendicular relative to the first thin-wall sections 2.1.2 and the end sections 2.1.1, and two thin-wall sections 2.1.4 are sections delimiting the PA carrier 2.1 laterally. Viewed towards the end section 2.1.1, all the thin-wall sections are located in the periphery of the end section 2.1.1, and especially the thin-wall section 2.1.4 is spaced from the relevant edge of the relevant end section 2.1.1. In this way, the PA carrier 2.1 can be provided with at least one hollow chamber. For example, in the illustrated embodiment, a plurality of hollow chambers 2.1.5 are formed alternately between the thin-wall sections respectively. Therefore, the PA carrier 2.1 can be manufactured as light as possible and at the same time can provide a sufficient support for the sheet metal part of the subframe 1. These hollow chambers 2.1.5 can be formed so as to communicate with each other.

In the illustrated embodiment, between two adjacent hollow chambers 2.1.5, a thin recess can be formed by a further thin-wall section 2.1.6 which is integrally formed with the respective thin-wall sections forming the two hollow chambers. The thin recess is used to receive the pre-foam 2.2.

FIG. 2 shows a state of only the PA carrier 2.1, a state of only the cured pre-foam 2.2 and a combined state of the PA carrier 2.1 and the pre-foam 2.2. For clarity, the respective sheet metal part is omitted in this figure. It can be seen that the hollow chambers 2.1.5 are left in the finished reinforcement part 2 such that it is still light and stiff. The reinforcement part 2 will be provided in the combined state of the PA carrier 2.1 and the pre-foam 2.2. After the reinforcement part 2 is inserted, at the area 1.1, into the sheet metal part of the subframe 1, the area 1.1 will be heated. After being heated, the pre-foam 2.2 will expand such that the reinforcement part 2 can be secured reliably in the sheet metal part of the subframe 1. To this end, the pre-foam 2.2 cited in the present invention can be any suitable structural pre-foam which is able to expand after being heated.

Figures 3, 4:
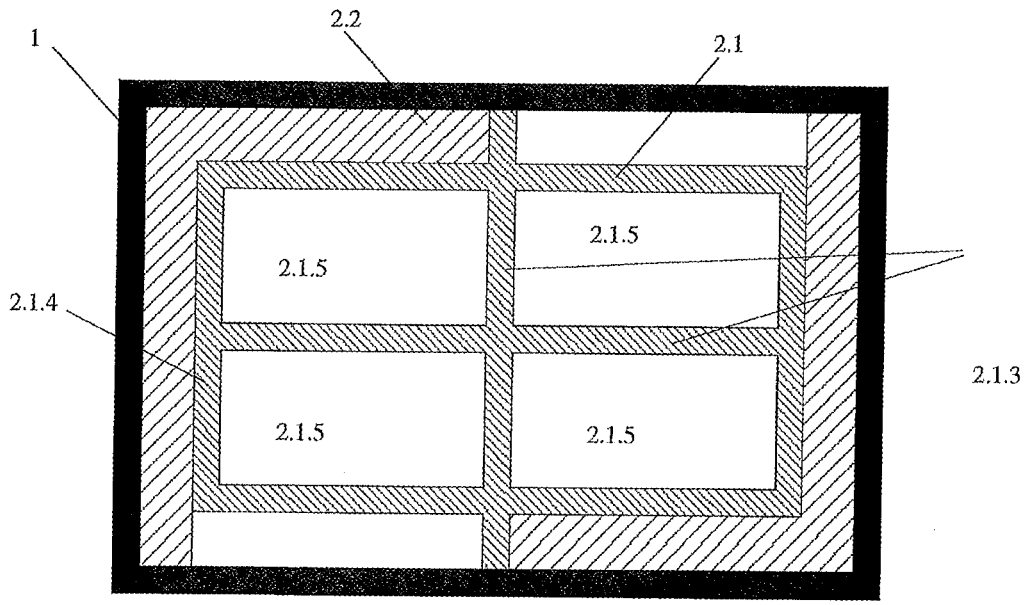
FIG. 3 schematically shows an enlarged sectional view of the reinforcement part of FIG. 2.
FIG. 4 schematically shows a flow chart, illustrating a method according to the present invention for reinforcing the subframe illustrated in FIG. 1.

FIG. 3 schematically shows a cross-sectional view obtained along an arrow A-A of FIG. 2. It can be seen that, in order to ensure that the stiffness of the PA carrier 2.1 is sufficient, the two thin-wall sections 2.1.3 extend perpendicularly relative to each other. The pre-foam 2.2 is filled between the relevant thin-wall sections of the PA carrier 2.1 and the inner surface of the sheet metal part of the subframe 1 so as to secure the PA carrier 2.1 with the sheet metal part firmly. Alternatively or preferably, it is also appreciated that the pre-foam can be filled into the hollow chambers so as to secure the carrier to the sheet metal part of the subframe.

Usually, if the area 1.1 is regarded as an area in which failure may occur, the sheet metal part of the subframe 1 at this area will conventionally be thickened. Instead, in order to reduce the total weight of the subframe 1, the sheet metal part of the subframe 1 at this area which is provided with the reinforcement part 2 according to the present invention can be thinned. Therefore, the present invention proposes a new technical solution of lightening the subframe for the vehicle, by which the total weight of the subframe can be reduced and it can be manufactured at lower costs.

Although a structure illustrated by FIG. 2 is used as a concrete example to explain the reinforcement part 2, it should be understood that the reinforcement part 2 is not limited to this structure. Alternatively, more thin-wall sections 2.1.3 can be provided in the PA carrier 2.1 at various orientations such that they may provide suitable and reliable support for the sheet metal part of the subframe 1. Furthermore, the reinforcement part 2 can be alternatively formed as a honeycomb-shaped structure, which has recesses on its periphery. The recesses can be used to cooperate with the inner surface of the sheet metal part of the subframe to form cavities in which the pre-foam can be filled.

Finally, FIG. 4 is a flow chart, schematically showing a method according to the present invention for reinforcing a subframe for a vehicle. The method generally comprises the following steps.

Step 1: Creating a computing model of a subframe for a vehicle.

In this step, any commercially available computer-aided engineering (CAS) software can be adopted in a computer. Therefore, the subframe can have any shape meeting requirements of manufacturing the vehicle.

Step 2: Analyzing the computing model of the subframe and determining one or more areas in which failure possibly occurs.

For example, the area can be defined as an area in which the largest stress or a break may occur when a simulating static or dynamic load is applied on the subframe. The load can be simulated as a load which may occur actually in the subframe.

Step 3: Designing and manufacturing a reinforcement part for the area found in step 2.

Since different vehicles are equipped with different subframes and the same subframe may be shaped variously at different areas, the reinforcement part should be customized to the area found in step 2. However, no matter how the area of the subframe is shaped, the basic principle of designing the reinforcement part is the same as that illustrated in FIGS. 2 and 3 as explained above. That is, the reinforcement part should comprise a lightweight carrier for supporting a sheet metal part of the subframe at the area and a pre-foam for securing the carrier to the sheet metal part. The lightweight carrier is first manufactured. Then it is placed in a mold which is previously produced similarly to the determined area. The PA carrier should be configured as a hollow structure and have recesses on its periphery such that, after the PA carrier is arranged in place, the pre-foam is injected into the recesses in a fluid state and then the pre-foam covers at least partly on the periphery of the carrier. By this way, the reinforcement is manufactured. It is appreciated that the pre-foam can be provided on the periphery of the carrier by other suitable high molecular polymer processing technologies.

Alternatively, in this step, the same or other commercially available CAE softwares can be adopted for verifying whether the area of the subframe is reinforced by the reinforcement part sufficiently or not. Further, such design and verification can be achieved in the case that the sheet metal part of the subframe is thinned at the given area.

Step 4: Installing the reinforcement part based on results of step 3 into the subframe.

In this step, the reinforcement part is first inserted into the hollow interior of the sheet metal part of the subframe at the determined area. Then, the subframe together with the reinforcement part would be transported through a coating line designed for the subframe. In the coating line, the subframe would undergo processes such as painting, baking and so on. During baking, heat is supplied to the pre-foam such that it expands and thus the reinforcement part is secured reliably within the sheet metal part of the subframe. It is appreciated that heat supplying is not limited to be achieved only in the coating line. Alternatively, an additional and independent step can be provided for heating the subframe, especially the area to enable the pre-foam to expand.

Although the present invention is shown and explained by specific embodiments, the present invention is not limited by these explained particulars. Contrarily, various modifications of the present invention are possible within the scope of attached claims and their equivalents.

What is claimed is:

1. A method for reinforcing a vehicle subframe comprising one or more hollow sheet metal parts, wherein the method comprises steps of:
   A) determining an area on a hollow sheet metal part of a vehicle subframe wherein the determined area is defined as an area of the hollow sheet metal part in which the most stress or failure possibly occurs when a static or dynamic load is applied to the vehicle subframe and wherein the hollow sheet metal part of the vehicle subframe is thinned at the determined area and wherein the step of determining the area is achieved by topology optimization technology in a computer;
   B) preparing a reinforcement part which is insertable into the hollow sheet metal part at said determined area, wherein the reinforcement part comprises:
      a. a carrier having a periphery; and
      b. a pre-foam of a foam material which is able to expand after being heated;
   wherein the carrier comprises at least one hollow chamber and the pre-foam is isolated from the at least one hollow chamber and is distributed at least partly on the periphery of the carrier; and
   C) installing the reinforcement part within the hollow sheet metal part of the subframe at the determined area and supplying heat to the pre-foam such that it expands to secure the reinforcement part within the subframe.

2. The method as claimed in claim 1, wherein the applied static or dynamic load is substantially the same as that applied to a subframe of an actually running vehicle.

3. The method as claimed in claim 1, wherein the carrier is made of polyamide.

4. The method as claimed in claim 1, wherein the carrier is made of a plurality of thin-wall sections for forming said at least one hollow chamber.

5. The method as claimed in claim 1, wherein in the step of preparing the reinforcement part, the carrier is placed in a mold which is manufactured similarly to the determined area, and then the pre-foam is injected into the mold such that the pre-foam is distributed at least partly on the periphery of the carrier.

6. The method as claimed in claim 1, wherein in (C) between installing the reinforcement part and supplying heat to the pre-foam, the reinforcement part within the hollow sheet metal part of the subframe is transported through a coating line designed for the subframe.

* * * * *